US007013595B1

(12) United States Patent
Jelasco et al.

(10) Patent No.: US 7,013,595 B1
(45) Date of Patent: Mar. 21, 2006

(54) CHUM DISPENSING ASSEMBLY

(76) Inventors: Marc Jelasco, 10688 Plainview Cir., Boca Raton, FL (US) 33498; Sandra Nicholson, 10688 Plainview Cir., Boca Raton, FL (US) 33498; Charles Britton, 22281 Sands Pt. Dr., Boca Raton, FL (US) 33433; Randolph K. Binter, 928 Fernwood Rd., Moorestown, NJ (US) 08057

( * ) Notice: Subject to any disclaimer, the term of this patent is extended or adjusted under 35 U.S.C. 154(b) by 106 days.

(21) Appl. No.: 10/429,612

(22) Filed: May 5, 2003

(51) Int. Cl.
*A01K 97/02* (2006.01)

(52) U.S. Cl. ...................................... 43/44.9; 222/144

(58) Field of Classification Search .............. 43/44.99, 43/42.06; 222/144, 519, 520, 548, 486, 507
See application file for complete search history.

(56) References Cited

U.S. PATENT DOCUMENTS

| | | | | |
|---|---|---|---|---|
| 1,102,559 A | * | 7/1914 | Verneuil | 222/547 |
| 1,497,199 A | * | 6/1924 | Sutthoff | 99/323 |
| 2,614,358 A | * | 10/1952 | Adams | 43/55 |
| 2,624,971 A | * | 1/1953 | Norton | 43/16 |
| 2,713,744 A | * | 7/1955 | Strausser, Sr. | 43/44.99 |
| 6,301,824 B1 | * | 10/2001 | Ashlock | 43/44.99 |
| 6,631,800 B1 | * | 10/2003 | Keeven | 206/37 |
| 6,711,849 B1 | * | 3/2004 | Moretti | 43/44.99 |

* cited by examiner

Primary Examiner—Peter M. Poon
Assistant Examiner—Bethany L. Griles
(74) Attorney, Agent, or Firm—Malloy & Malloy, P.A.

(57) ABSTRACT

A chum dispensing assembly comprising a container having a substantially elongated, cylindrical configuration defining a hollow interior for the containment of chum. The container comprises a separable portion movably mounted on or connected to a remainder of the container by a connecting assembly disposed and structured to facilitate substantially linear, axial displacement of the separable portion outwardly from the remainder of the container to form a dispensing opening through which chum passes from the hollow interior. Displacement of the separable portion into the open position is normally accomplished by a predetermined "pulling" force exerted on an upper end of the container when submerged at a location where the chum is intended to be dispensed.

28 Claims, 10 Drawing Sheets

CHUM DISPENSING ASSEMBLY

BACKGROUND OF THE INVENTION

1. Field of the Invention

This invention relates to a chum dispensing assembly comprising a container having a separable portion which may be axially displaced from the remainder of the container so as to create a dispensing opening. Chum is selectively dispersed from the interior of the submerged container upon a pulling force being exerted on the container, which is sufficient to axially displace the separable portion and open the dispensing opening.

2. Description of the Related Art

The use of chum is universally recognized as a means of attracting fish to an area or vicinity where fishing occurs or, for a variety of other reasons, when it is desired that fish congregate. The term "chum" is widely used to define various types of animal matter such as, but not limited to, fish parts, blood, fish oil, and a variety of other animal substance. The process of "chumming" has been found to be useful in both fresh and salt water fishing but is particularly useful for attracting a large variety of fish in a saltwater environment.

Chumming techniques and apparatus vary greatly and include the most basic act of poring blood and like animal matter overboard of a marine craft. However, over time it was clearly recognized that the dispersing of chum at a selected depth at which the baited hook of the fisherman is intended to be located, was most efficient. As a result, a variety of different types of chum dispensing apparatus have been employed and again range from the more simplistic structural and functional apparatus to relatively complicated, selectively operable dispensing devices.

In the former category, relatively simple mesh material baskets, porous material bags or like structures have been used to contain chum. Such devices are typically weighted or otherwise structured to facilitate the submerging thereof to the floor or other level within the body of water where fishing is to take place. Obvious disadvantages associated with theses types of devices normally involve dispensing of the chum at an inappropriate rate i.e.; either too slowly or too rapidly. As with the above described devices, other relatively simple chum dispensing apparatus includes a dispenser structure suspended by rope, line, etc. which is lowered to a predetermined or desired depth. Typically, a housing in which the chum is stored includes a plurality of through holes. A closure structure such as, but not limited to, a piviotly mounted flap or like member is normally secured in a closed position during the lowering of the dispensing device. Upon reaching a preferred level, a release mechanism is activated thereby allowing the flap or like closure structure to move to an open position. As a result most, if not all, of the chum content passes from the interior from the housing into a surrounding area.

Therefore, many categories of fishing, particularly salt water fishing, use chum dispensing devices to the extent that the use of chum in some types of fishing has become an inherent part of the fishing process. Such extensive use of chum has led to more sophisticated chum dispensing devices specifically structured to overcome certain problems recognized in the chumming procedure. By way of example only, one recognized disadvantage in known dispensing devices, including the relatively simple structures of the types set forth above, include problems of accurately positioning the chum device in areas where even a minimal current exist. As a result, improved chum dispensing structures have attempted to provide dispensing bodies or housings structured to be quickly and easily lowered to a preferred depth. At the same time, such devices are designed to avoid "drifting" along with an existing current. Also it is frequently important for a user to be able to selectively control a rate of chum dispersal from the dispensing structure.

Another factor to be considered when using a chum dispensing device is the type of chum best suited for the category of fishing to be conducted. As previously indicated, chum originates from a variety of different animal material ingredients and as such significantly varies in weight, solidity, viscosity, etc. Therefore in order to avoid the necessity of having a plurality of different types of chum dispensing devices, it is a distinct advantage to utilize a dispensing assembly having sufficient structural and functional versatility to allow for the selective dispersion of different varieties of chum or a combination thereof, at a preferred rate of distribution. Additional factors to be considered include strength of material, complexity of use, size, weight, etc, of a chum dispensing assembly. Moreover, a preferred combination of these structural and functional characteristics could result in a chum dispensing assembly having the preferred versatility to overcome problems and disadvantages which have long been recognized in the sport of fishing.

Therefore, there is a need for an effective chum dispensing assembly which is relatively uncomplicated in its structural and functional features and which is made from a durable material capable of withstanding the relatively harsh environment to which dispensing devices of this type are routinely subjected. In addition the cost and operational effectiveness of a chum dispensing assembly should be such as to assure a long operable life, while at the same time allowing the dispensing assembly to be commercially available to a wide range of consumers.

SUMMARY OF THE INVENTION

The present invention is directed to a chum dispensing assembly of the type designed to be submerged, such as by being lowered from a marine craft, dock, etc. by means of a rope or line attached to a predetermined portion thereof. More specifically, the subject chum dispensing assembly comprises a container preferably having an elongated configuration including a substantially cylindrical sidewall disposed in surrounding relation to a hollow interior. As expected, the hollow interior is dimensioned and configured to at least temporarily contain a predetermined amount of chum, wherein the specific category or type of chum utilized may vary. Moreover, the structural and functional versatility of the chum dispensing assembly of the present invention facilitates its use with chum in the form of a frozen commodity, prepackaged, freshly cut, semi-solid, and/or a combination thereof.

Access to the hollow interior is preferably by means of a fill opening formed in the container at one end thereof. It is also contemplated that a fill opening in other appropriate portions of the container is intended to be included within the spirit and scope of the present invention. However, the location of the fill opening should be such as to not interfere with the other functional and/or operational characteristics of the chum dispensing assembly of the present invention.

In that the chum dispensing container is intended to be submerged to a predetermined level within a body of water, the container includes a plurality of vents formed in the sidewall and possibly other locations adjacent the opposite end portions thereof. These vents will allow the inflow of water and concurrent escape of air into and from the hollow interior as the container is being submerged. The sinking or travel of the container to a predetermined depth at which the contained chum is intended to be dispensed is thereby further facilitated. The plurality vent openings may vary in number, location, dimension and configuration. In addition, other openings formed within the container may be structurally and functionally intended to be primarily used for purposes other than the inflow of water into the hollow interior. However the presence of such openings may further serve to rapidly fill the hollow interior and thereby better facilitate the quick and easy travel of the container to the intended depth.

Another feature of the chum dispensing assembly of the present invention which facilitates the sinking of the container is the ability of the user to add an appropriate amount of weight to the container. More specifically, the container includes a chamber or compartment located thereon and accessible from the exterior of the container. The dimension and configuration of the compartment is sufficient to hold one or more weight members, which may have a variety of different shapes and configurations. This allows commonly available items to be used as weights such as, but not limited to, sinkers and the like. For purposes of symmetry and overall appearance of the container, the weight containing compartment may be closed by a screw on lid or other type of closure structure which is substantially equivalent to a screw on lid or closure of the type used to cover the aforementioned fill opening. Also, the ability of the user to selectively add weight to the container to facilitate its sinking, also has the added advantage of providing a substantially light weight easily transportable device such as when the container is shipped from the manufacturer or supplier and/or when the container is being carried or positioned on or within a marine craft by a user thereof.

As set forth above depending upon the intent of the user and of course on the fishing conditions, it may be preferred to disperse the chum from within the hollow interior to an exterior area at selectively different rates. Accordingly, the structural versatility of at least one preferred embodiment of the chum dispensing assembly allows the user to at least partially select the rate at which the chum is dispensed. Therefore, a most preferred embodiment of the present invention comprises the container having a separable portion preferably, but not necessarily, disposed at and at least partially defining one end of the container. The separable portion is movable relative to a remainder of the container through the provision of a connecting assembly. The connecting assembly is formed in part on and/or connected to both the separable portion and the remainder of the container from which the separable portion may be displaced. The end of the container defining the location of the separable portion is most preferably at the bottom end thereof. In this context, the bottom of the container is defined by the lower most end of the container when it is normally disposed in an operative, substantially "upright" orientation during the lowering and positioning thereof, once submerged.

As also explained in greater detail hereinafter, the connecting assembly is structured to facilitate a linear or axial displacement of the separable portion outwardly from the remainder of the container as the separable portion passes between the closed position and the open position. In order to rapidly and more completely dispense the chum contents from the hollow interior, the container further includes a dispensing opening. The dispensing opening is clearly defined by the spacing between the separable portion and the remainder of the container when the separable portion is in the aforementioned "open" position when displaced from a remainder of the container. Also, the dispensing opening can be said to be located at the "junction" of the separable container and the remainder of the container from which it is separated when the separable portion is in its closed position. Moreover, the dispensing opening is disposed substantially continuously about a transverse periphery of the container sidewall, when the separable portion is in the fully open position.

Due to the fact that the separable portion preferably is located at or substantially defines the bottom end of the container, its orientation in the open position is accomplished by exerting a sharp, upwardly directed, pulling or tugging force on the supporting line connected to the container preferably at the upper end thereof. In addition, the orientation of the separable portion in the open position is further facilitated by locating the weight containing chamber within the separable portion thereby adding weight directly to the separable portion and facilitating its outward, axial displacement from the remainder of the container when the aforementioned upwardly directed pulling force is exerted on the supporting line.

In order to best accomplish axial displacement of the separable portion from the remainder of the container, the connecting assembly comprises at least one, but preferably a plurality of track portions formed in the sidewalls thereof. The connecting assembly further comprises a plurality of track followers or follower portions which, in at least one embodiment are at least partially defined by elongated struts, connected to the separable portion and movable therewith. Therefore, the exertion of the aforementioned upwardly directed pulling or tugging force will cause the track followers to slide or otherwise linearly travel along at least a portion of corresponding track portions on or in which they are mounted. A linear, axial displacement of the separable portion will thereby be accomplished. Rapid and complete dispersement of the chum contents from the hollow interior will result as the dimensions of the formed dispensing opening will allow passage of significantly great quantities of the chum there through from the hollow interior.

A more restricted dispensing of the chum contents from the hollow interior may be accomplished through the provision of at least one but preferably a plurality of dispensing apertures. The dispensing apertures are collectively disposed about a transverse periphery of the container in contiguous relation to the dispensing opening and/or the junction between the separable portion and the remainder of the container. Regardless of the position of the separable portion in either a closed or open position, the dispensing apertures always remain open such that when the container reaches a level at which the chum is to be dispensed, the number, size and the location of the plurality of dispensing apertures will facilitate a slower rate of passage of the contained chum there through than would occur if the dispensing opening was in a fully opened position.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
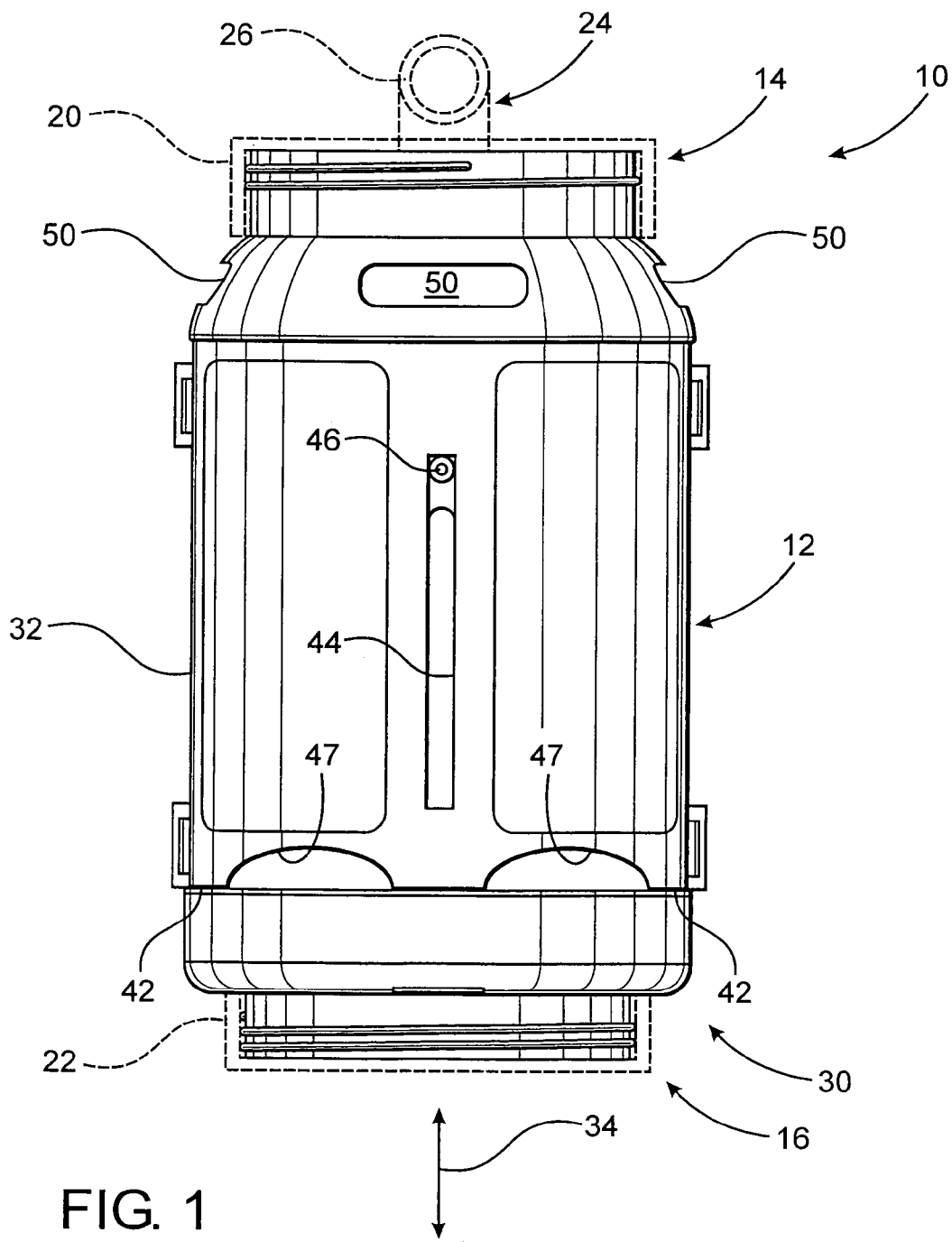
FIG. 1 is a front view in partial phantom of a preferred embodiment of the chum dispensing assembly of the present invention.

As shown in the accompanying drawings, the present invention is directed to a chum dispensing assembly generally indicated as 10, of the type to be lowered to a depth in a body of water where fishing is to occur. As such, the assembly comprises a container generally indicated as 12, preferably having an elongated, substantially cylindrical configuration terminating in oppositely disposed first and second ends 14 and 16, respectively. As clearly represented throughout the various Figures of the included drawings, the first and second ends 14 and 16 may both be opened as at 14' and 16', as will be explained in greater detail hereinafter. As such, the container 12 includes one open end 14 defining a fill opening 14' disposed in communicating relation with the hollow interior 18. The fill opening 14' is dimensioned and disposed to allow the passage of chum there through into the hollow interior 18 of the container 12.

The hollow interior 18 is sufficiently dimensioned to hold chum therein, wherein the quantity of the chum being contained within the hollow interior 18 may vary. Assuming the container 12 includes the fill opening 14' and the oppositely disposed opening 16', each end 14 and 16 will include a cover structure as at 20 and 22 respectively, removably mounted thereon. For purposes of clarity, the cover structures 20 and 22 are represented in phantom lines in that each of the cover structures 20 and 22 may assume a variety of different structures and/or configurations. In the preferred embodiment of FIGS. 1 and 2, the cover structures 20 and 22 are internally threaded or otherwise structured so as to be removably secured to be externally threaded peripheral surfaces of the respective ends 14 and 16.

It should be further noted that the cover member 20 associated with the top, first end 14 includes an attachment assembly generally indicated as 24 which may be integrally or otherwise fixedly secured to the cover member 20. The attachment assembly 24 includes a loop, hook or other appropriate member 26 to which a rope, line, etc, may be attached to facilitate lowering of the container 12 to the intended depth within the body of water being fished. It is also emphasized that the attachment member 26 may be disposed directly on the container 12 at other appropriate locations, rather than on the cover member 20. Regardless of its specific location, the attachment assembly 24 and in particular the attachment member 26, should be disposed to facilitate a substantially "upright" orientation of the container 12 as it is being lowered and particularly when it reaches an intended depth at which the chum is to be dispersed.

As set forth above, the opening 14' of an upper most end 14 of the container 12 defines the fill opening through which chum is loaded into the hollow interior 18. However, the opposite or lower end 16 of the container 12 includes a compartment or chamber 17 (see FIG. 7), at least partially defining a weight retaining portion. The chamber 17 is accessible from the exterior of the container 12 by the removal of the cover member 22. Accordingly, the opening 16' is disposed in direct communicating relation with the chamber 17. The chamber 17 is specifically dimensioned and configured to receive and removably retain one or more weight members which may comprise a variety of different structures. Further, the amount of weight added to the container may be determined by the user of the chum dispensing assembly 10 and may be dependant upon a number of environmental conditions including the existence of water currents and/or the depth at which the container 12 is to be lowered. As will be discussed in greater detail hereinafter, the addition of a selected amount of weight into the chamber 17 not only facilitates the lowering of the container 12 to the desired depth it also facilitates the establishment of a dispensing opening 40 between a separable portion 30 and a remainder of the container 32. Further, the ability to add one or more weight members to the chamber 17, thereby increasing the weight of the container 12, not only facilitates its use but also eliminates expense in the manufacture and shipping of the container 12 which is formed from a plastic or other high strength but lightweight material. Significant advantages over relatively heavy, metallic or other material chum dispensing devices of conventional design is thereby accomplished.

Figure 2:
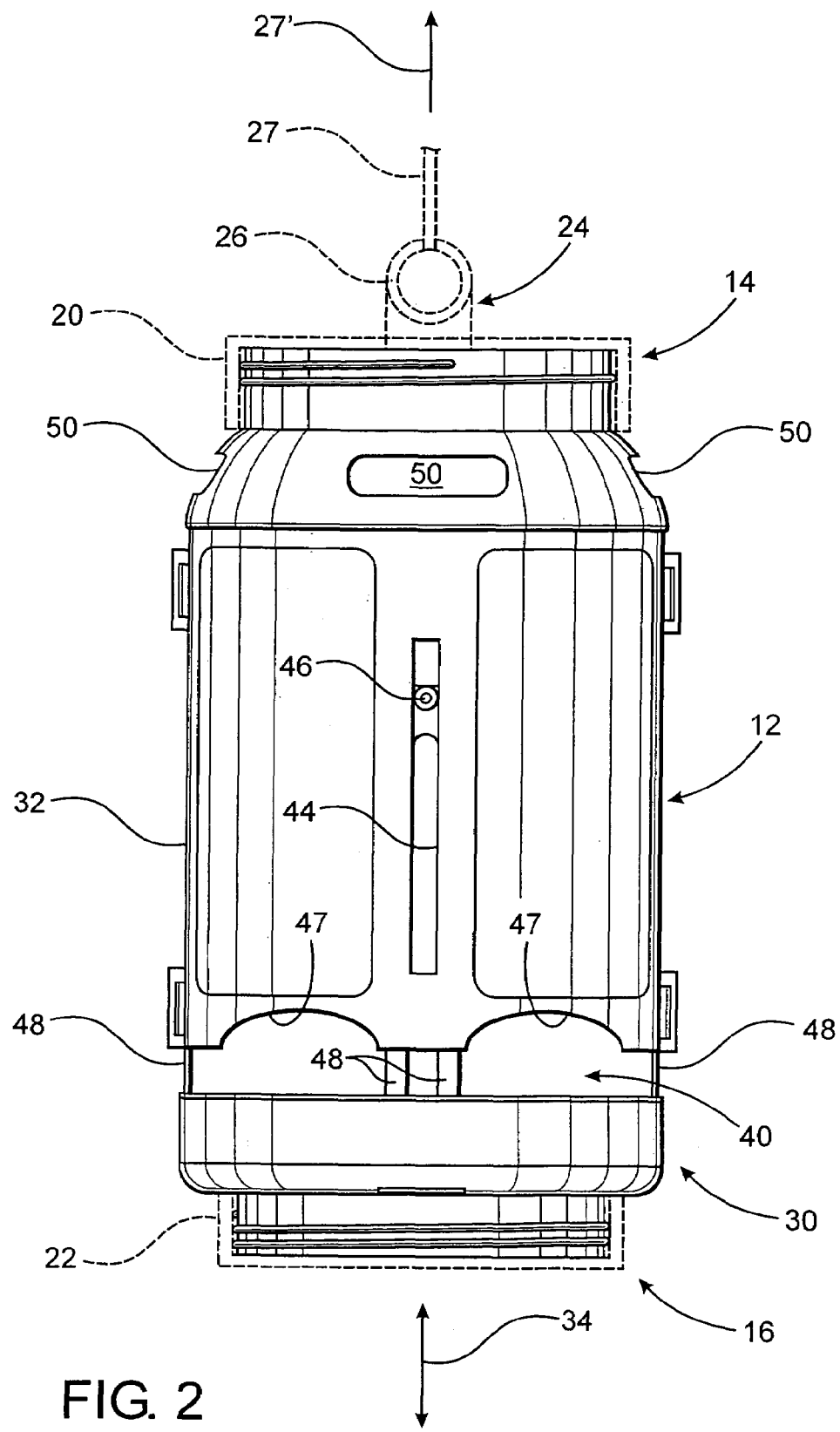
FIG. 2 is a front plan view of the embodiment of FIG. 1 in an open, freely dispensing position.

Another feature of a most preferred embodiment of the container 12, as clearly represented in FIGS. 1 and 2, is the provision of a separable portion 30. The separable portion 30 is located at and/or directly associated with the second end 16 of the elongated container 12 and thereby at least partially defines what may be referred to as a "bottom end". The term "bottom end" is meant to refer to the end of the container 16 which is disposed in a lower most position when the container 12 is in the preferred, operative, upright position of FIGS. 1 and 2. As set forth above and disclosed in FIGS. 1, 2 and 7, the weight containing chamber 17 as well as the cover member 22, are disposed on the separable portion 30 so as to move therewith relative to a remainder portion 32 of the container 12.

More specifically the separable portion 30 is movably attached to the remainder portion 32 of the container 12. In at least one preferred embodiment the terms "remainder" and/or "remainder portion" are meant to include that portion of the container 12 from which the separable portion 30 is displaced when in an open position represented in FIG. 2. Further, the movable attachment of the separable portion 30 relative to the remainder 32 of container 12 facilitates displacement of the separable portion between the open position of FIG. 2 and the closed position of FIG. 1. As such, the separable portion 30 is movable in a somewhat reciprocal manner linearly and/or axially towards and away from the remainder 32 of the container 12 as schematically represented by directional arrow 34 in FIGS. 1 and 2.

Therefore, it should be apparent that the chum dispensing assembly 10 and more particularly the container 12 includes a dispensing opening generally indicated as 40 and best represented in FIG. 2. The dispensing opening 40 is disposed adjacent the bottom end 16 and more specifically between the separable portion 30 and the remainder 32 of the container 12. Obviously, the dispensing opening 40 is more evident when the separable portion 30 is in the open position of FIG. 2 and axially or linearly displaced outwardly from the remainder 32. The dispensing opening 40 therefore represents the primary path of travel of the chum contents within the hollow interior 18 as the chum passes therefrom to the exterior of the container 12 in the intended fashion. It is of course understood that disbursement of the majority or at least a significant portion of the chum contents from the hollow interior 18 be delayed until the container 12 reaches the predetermined location or depth at which the chum is intended to be dispersed. Accordingly as the container is first loaded with chum and subsequently lowered, the separable portion 30 is maintained in the closed position in FIG. 1. As such, the dispensing opening is disposed at and at least partially defined by a junction 42 between the separable potion 30 and the remainder 32 of the container 12 when the separable portion 30 is in the closed position.

Figure 6:
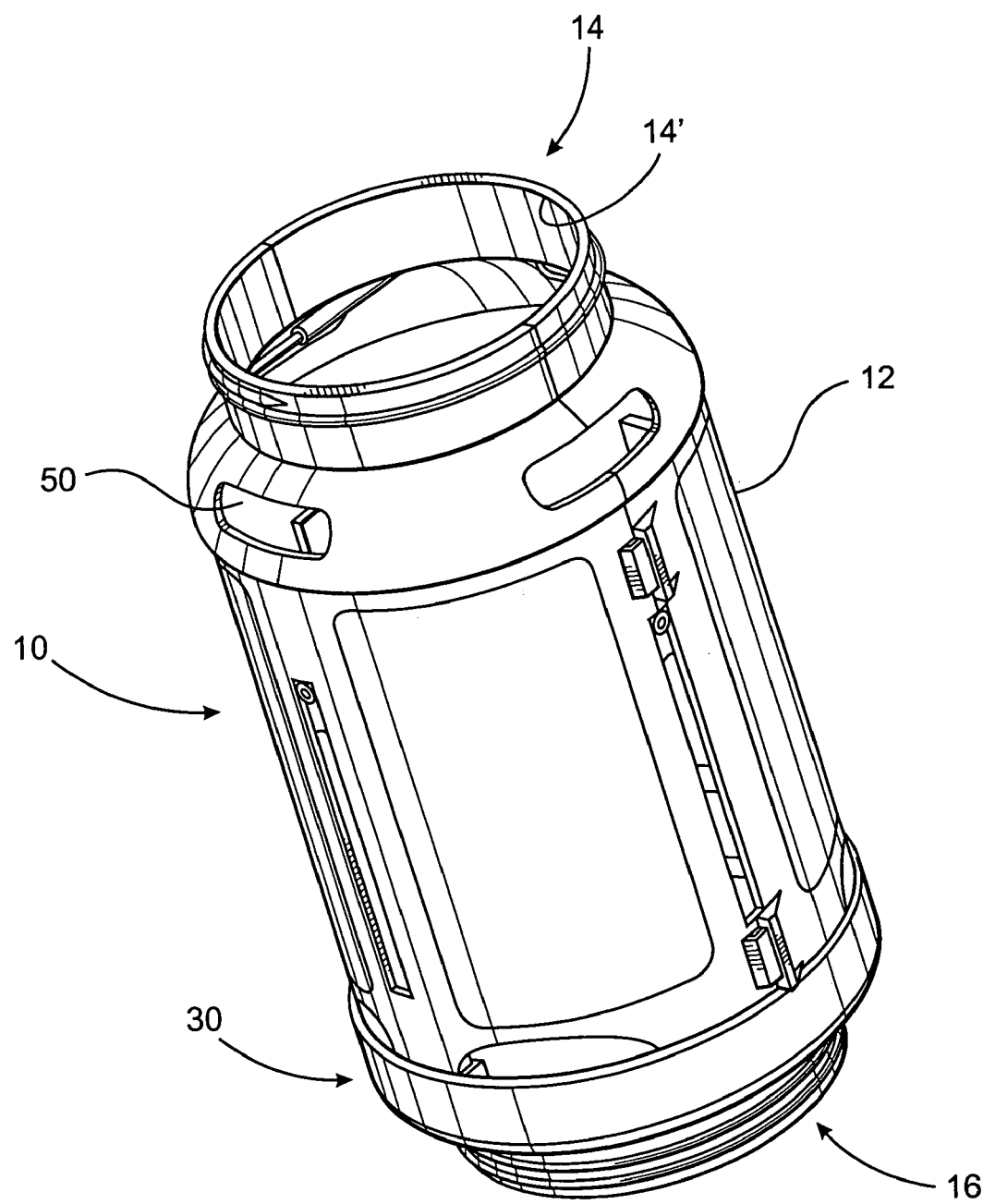
FIG. 6 is a top perspective view of the preferred embodiments of FIGS. 1 and 2.
Figure 7:
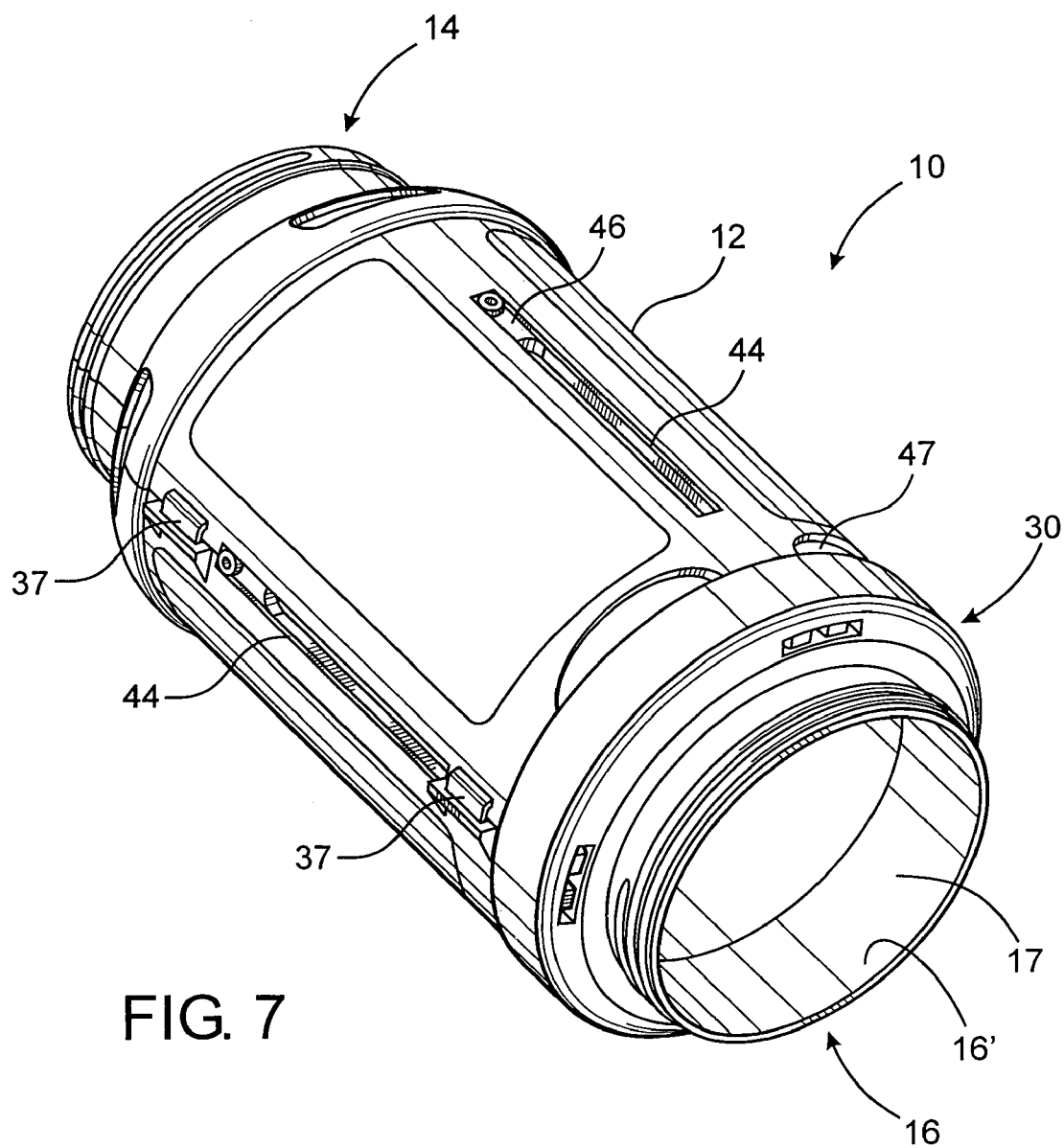
FIG. 7 is a bottom perspective view of the preferred embodiment of FIGS. 1 and 2.
Figure 8:
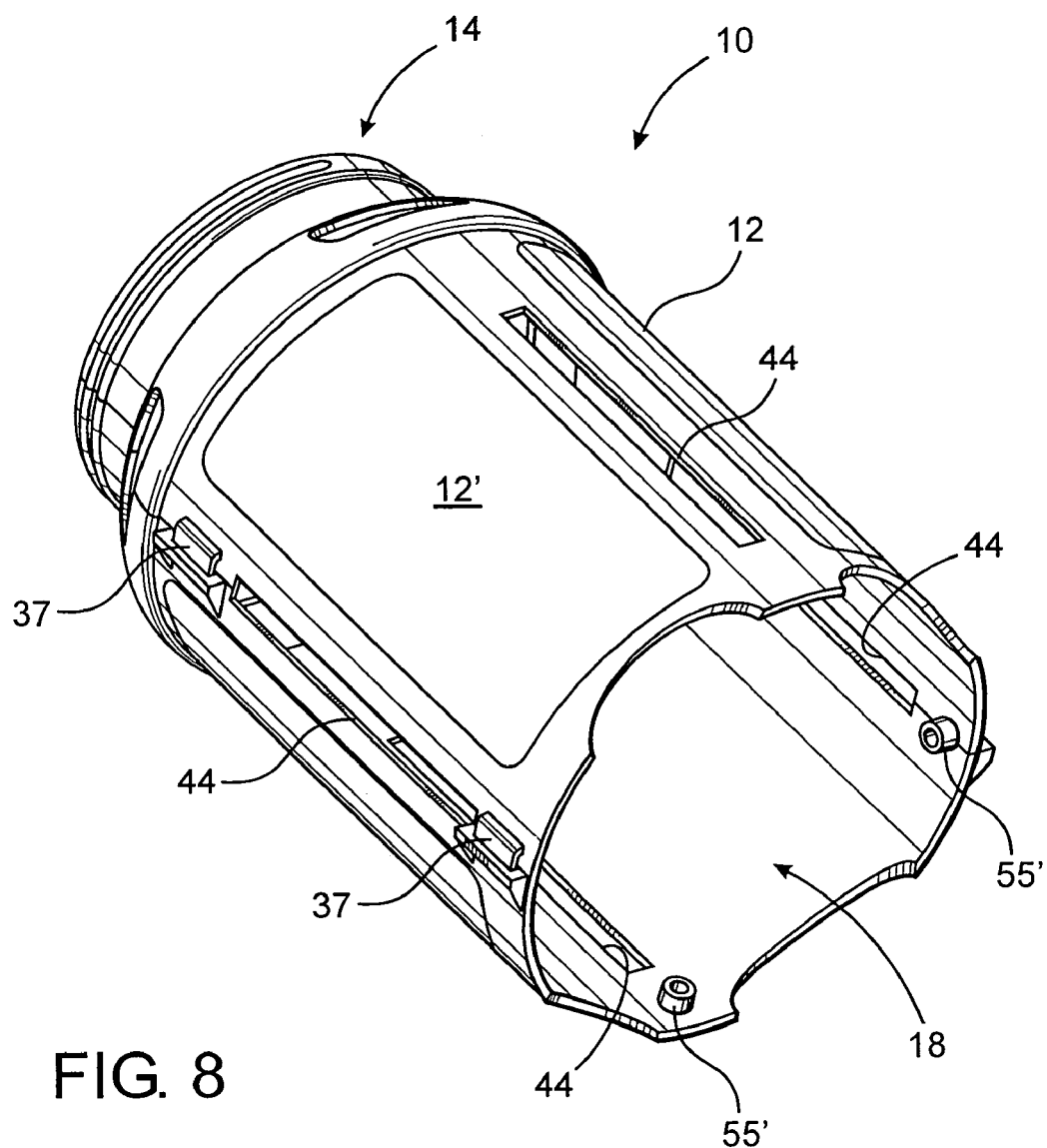
FIG. 8 is a bottom perspective view showing interior areas of one portion of the embodiment of FIGS. 1 and 2.
Figure 9:
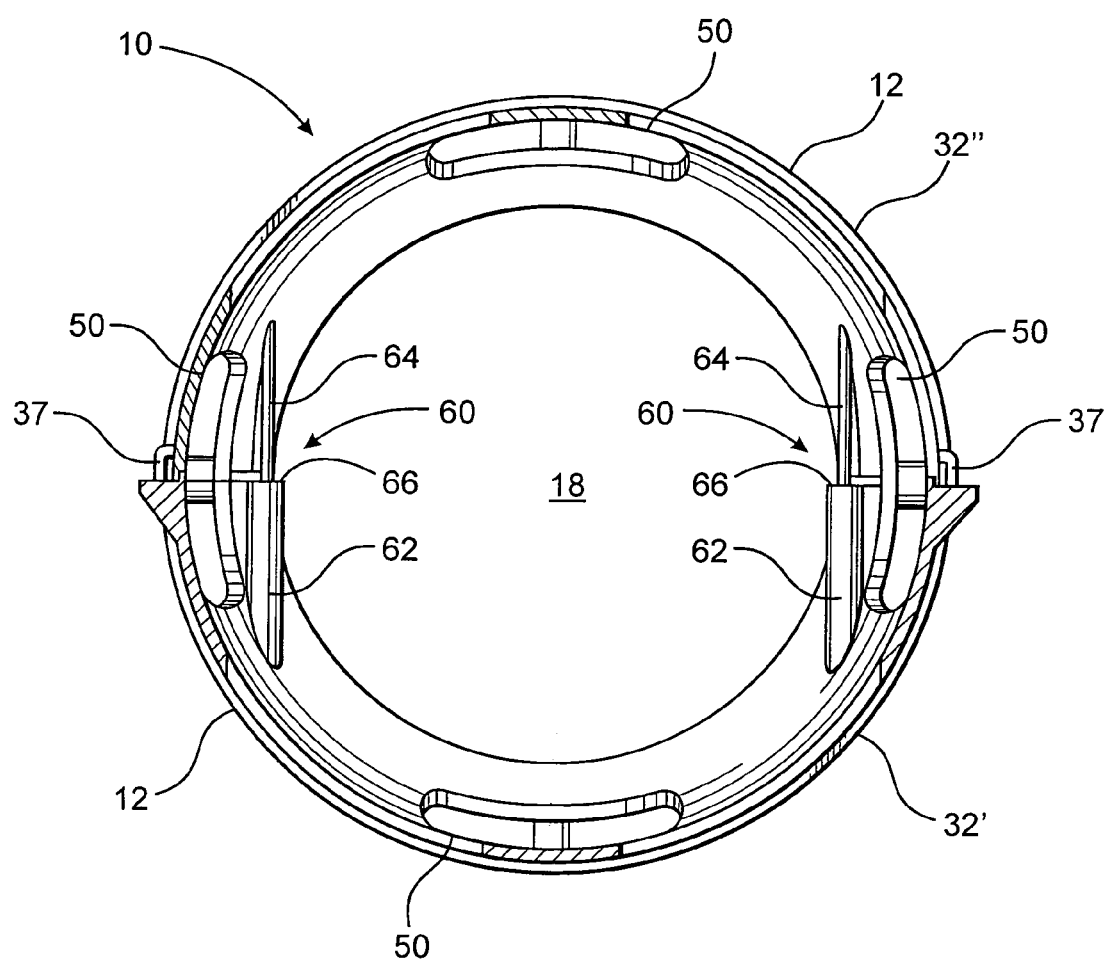
FIG. 9 is an end, interior view of the embodiment of FIG. 8.
Figure 10:
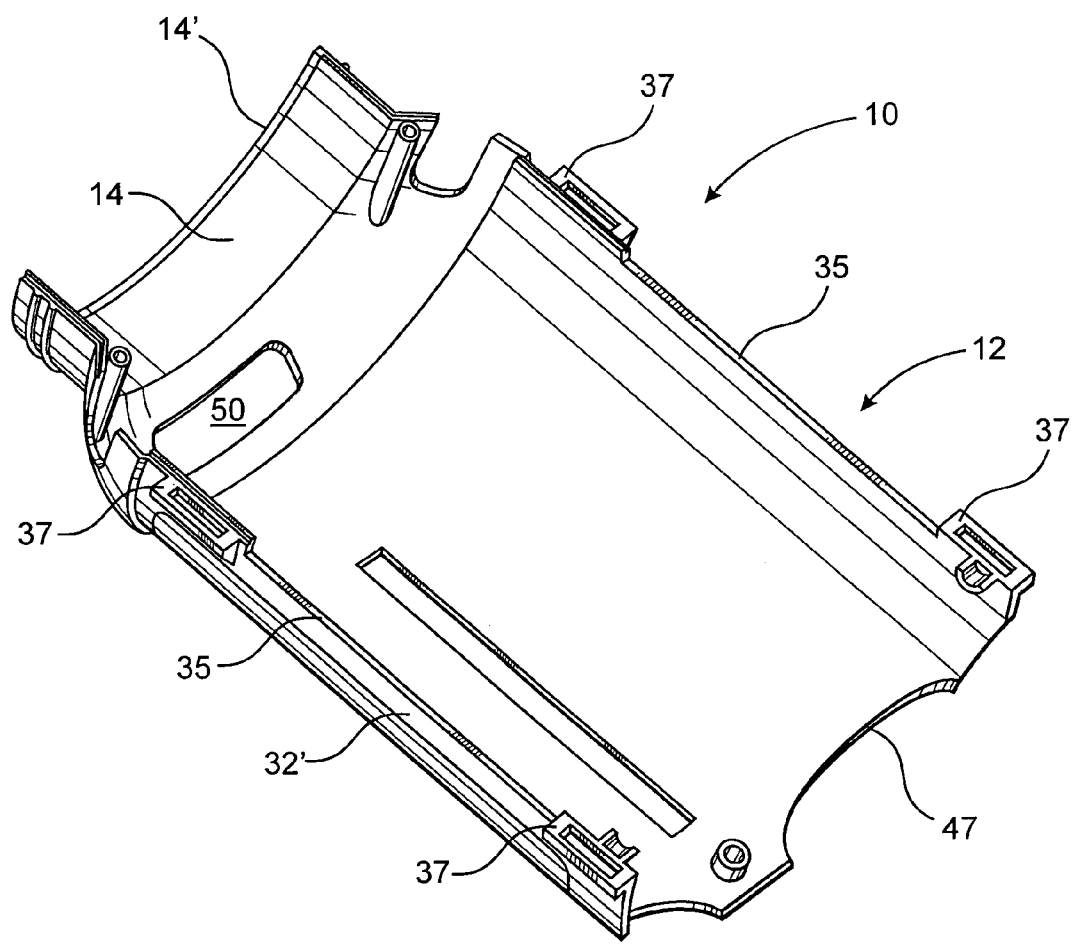
FIG. 10 is a detailed perspective interior view of a portion of the embodiment of FIGS. 8 and 9.

In order to selectively dispose the separable portion 30 from the closed position of FIG. 1 into the open, dispersing position of FIG. 2 in a reliable manner, a most preferred embodiment of the chum dispensing assembly 10 of the present invention includes a connecting assembly. The connecting assembly is structured to movably interconnect the separable portion 30 to the remainder portion 32 of the container 12. More specifically, the connecting portion comprises a track assembly including at least one but preferably a plurality of track portions 44 at least partially defined by integrally or otherwise formed slots and/or recesses in the container 12 and extending along a portion of the length thereof. As shown in FIGS. 6 through 8, the plurality of tracks 44 are oriented in substantially parallel, spaced apart relation to one another as they are disposed in the cylindrical sidewall 12' of the container 12. In a preferred embodiment, the plurality of track portions 44 are four in number. It should be apparent however that the number of track portions 44 may of course vary depending on the overall structure and configuration of the container 12 and the separable portion 30, as well as a variety of other factors. Also, it is indicated that each of the track portions 44 pass completely through the cylindrical sidewall 12'. However, a structural modification of the container 12 may include the one or more track portions 44 not extending completely through the cylindrical sidewall 12', which is also within the intended spirit and scope of the present invention.

Figure 3:
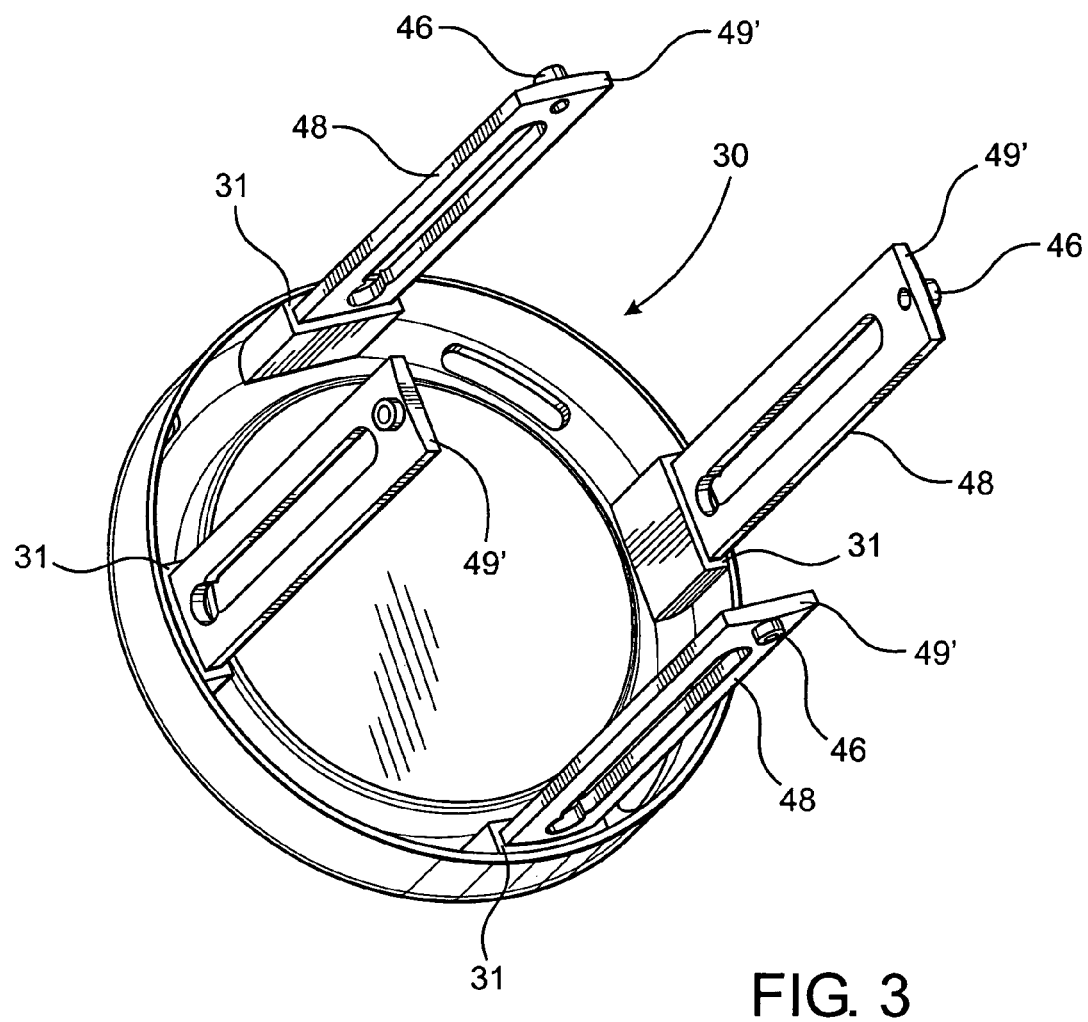
FIG. 3 is a perspective view of a separable portion associated with the embodiment of FIGS. 1 and 2.
Figure 4:
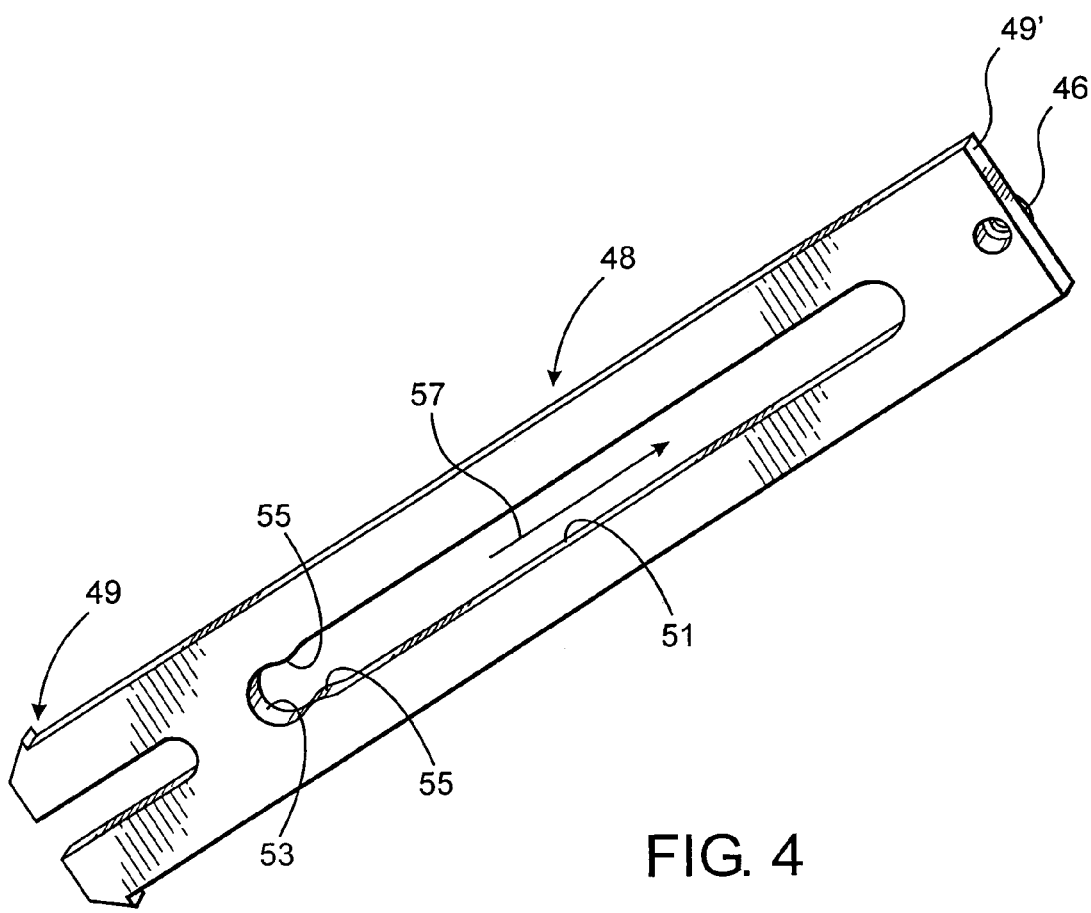
FIG. 4 is a detailed view in perspective of one of a plurality of struts at least partially defining a track assembly.
Figure 5:
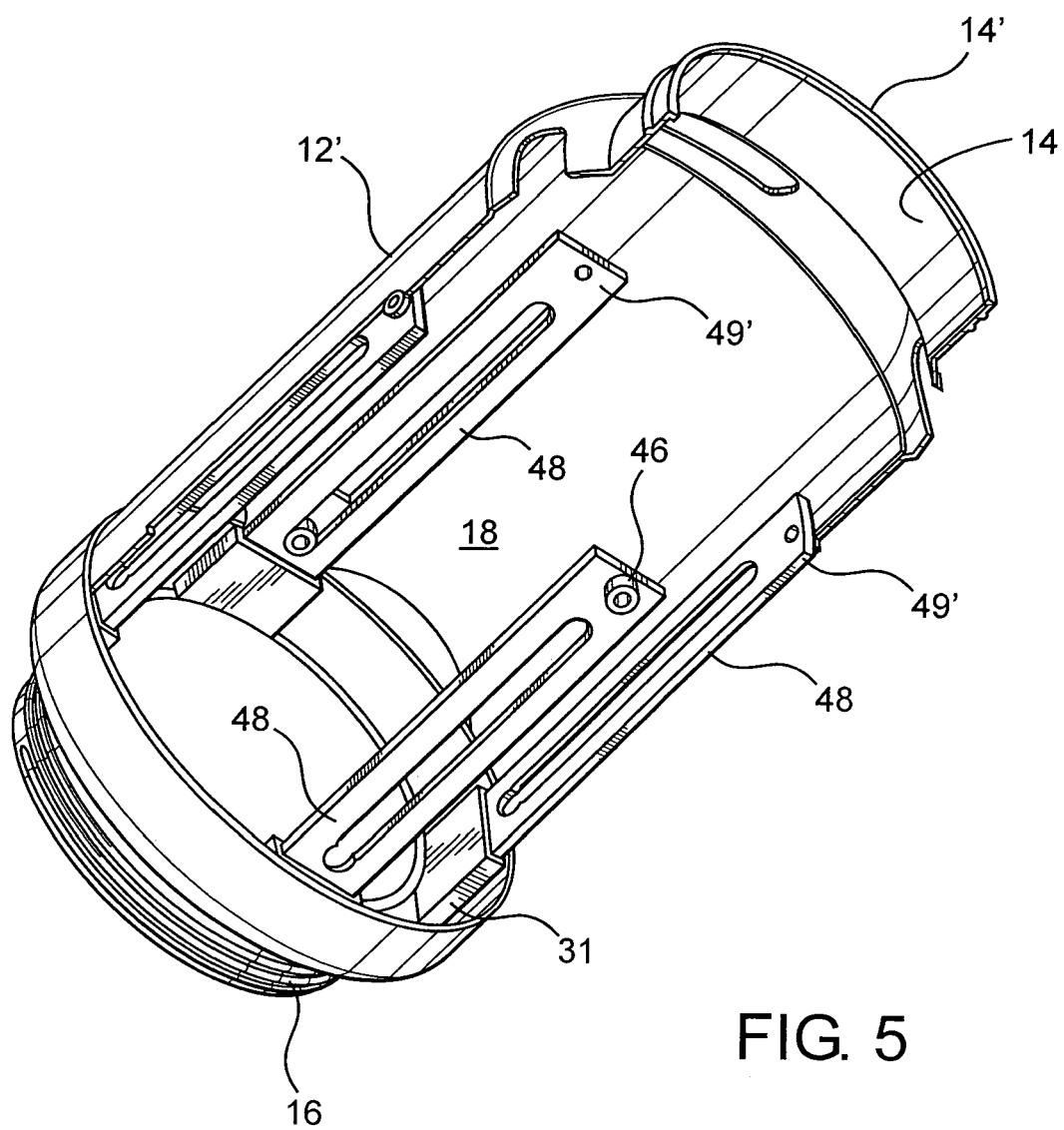
FIG. 5 is a interior perspective view of a portion of the embodiment of FIGS. 1 and 2 in an unassembled form.

The connecting assembly and more particularly the track assembly also includes at least one but preferably a plurality of follower portions 46. As indicated, the number of follower portions 46 are equal to the number of track portions 44. However it is emphasized that the number of track portions 44 and follower portions 46 may vary while still maintaining the structural integrity of the dispensing assembly 10 and its intended operable and functional features. Further, each of the follower portions 46 is connected to the separable portion 30 by means of elongated struts 48, shown in detail in FIGS. 3–5. The ends 49 of each of the struts 48 are connected to the separable portion 30 by being received within sockets or receiving portions 31 as shown in FIG. 3. The opposite ends 49' of the struts 48 include a corresponding one the follower portions 46 connected thereto. Therefore the follower portions 46 and the struts 48 are connected directly to the separable portion 30 and are movable therewith in a reciprocal, linear and axial direction, schematically indicated by directional arrow 34. As the separable portion 30 is disposed between the closed and open positions of FIGS. 1 and 2, the follower portions 46 travel within and along the respective track portions 44. Similarly, the struts 48 are linearly displaced and travel along and or in confronting relation with an interior surface of the sidewall 12' as should be apparent from a review of FIG. 5.

Engagement between the follower portions 46 and the track portions 44 is provided by frictional engagement between corresponding and confronting peripheral edges or portions thereof as disclosed. As such, the follower portions 46 may be forced to slide along at least a portion of the length of the corresponding track portions 44. In use, prior to being submerged to a predetermined depth, the chum is loaded into the hollow interior 18 through one or both of the fill openings 14' and 16'. Once the chum is disposed within the hollow interior, the separable portion 30 is oriented in the closed position of FIG. 1. Also, prior to being submerged, the closure members 20 and 22 are secured in the manner represented in FIGS. 1 and 2.

Naturally, when using the chum dispensing assembly 10 of the present invention it is desired, in most instances, that a majority of the chum not be dispersed until the container 12 has reached a predetermined level. Therefore, an additional structural feature of the container 12 is directed to maintaining the separable portion 30 in the closed position relative to the remainder portion 32 until the upwardly directed pulling force 27' on the connecting line 27 is applied. With primary reference to FIGS. 4, 5 and 8 each of the struts 48 include an elongated open channel as at 51. One end of the channel 51 includes a receiving portion 53 and an adjacently positioned retaining portion 55. The retaining portion 55 is defined by an inwardly directed "narrowing" of the channel 51. Accordingly, the channel 51 and the receiving portion 53 are disposed and dimensioned to movably receive outwardly extending fingers or nipples 55' formed on the interior surface of the sidewall 12' and disposed in alignment or registry with the elongated channels 51. When the separable portion 30 is in the closed position of FIG. 1, the nipples 55' will be located within the receiving portions 53 of the corresponding strut 48. The provision of the retaining portion 55, having a lesser transverse dimension than the diameter of the nipple 55' will serve to maintain the nipple 55' within the receiving portion 53. However the dimension of the receiving portion 55, being only minimally smaller than the diameter of the nipple 55' will allow for the nipple 55' to be removed from the receiving portion and travel upwardly in accordance with directional arrow 57 along the length of the channel 51, when a sufficient, upwardly directed pulling force 27' is applied to the line 27.

However, it is emphasized that the relative dimensions between the retaining portion 55 and the corresponding nipples 55' is such as to maintain the separable portion 30 in the aforementioned closed position during the lowering of the container 12 and until the upwardly directed force 27' is applied to the container 12, in the manner set forth above. Premature dispersal of the chum content from the hollow interior 18 of the container 12 is thereby prevented.

Once the container 12 is at the predetermined depth such as described above, adjacent and/or in contact with the floor of the body of water where chum dispersal is to occur, an upwardly directed pulling or tugging force, of sufficient, predetermined magnitude is exerted on the container 12 by a user thereof pulling upwardly on the attached rope or line 27. Such an upwardly directed force 27' will have the effect of axially or linearly displacing the separable portion 30 from the closed position of FIG. 1 to the open position of FIG. 2. As should also be apparent the existence of the added weight within the chamber 17 on the bottom end 16 of the separable portion 30, will also facilitate opening of the separable portion 30 and the axial displacement thereof away from the remainder portion 32 of the container 12, once the force 27' is applied.

Therefore, as the container 12 is being lowered to the intended depth, a plurality of vents or vent openings 50 as well as the open track portions 44 will cause the hollow interior 18 to fill with water. As such, portions of the hollow interior 18 not already occupied by the chum content will in turn be filled with water. A forceful pulling or tugging 27' on the line 27 will exert sufficient force on the remainder portion 32 to cause the separable portion 30 to be disposed between the closed position of FIG. 1 and the open position of FIG. 2. The dispensing opening 40 will therefore be defined by the spacing between the separable portion 30 and the remainder 32 of the container 12 and be of sufficient dimension to allow most, if not all, of the remaining chum contents within the container 12 to pass there through to the surrounding area. It should be apparent therefore that the cooperative structuring, dimensioning and configuring of the connecting assembly, including the aforementioned track assembly, as well as the container 12 and separable portion 30 are such as to effectively and reliably dispose the separable portion 30 in the aforementioned open position of FIG. 2, as the container 12 is in the preferred upright, operative position, shown in FIGS. 1 and 2.

Other features included in at least one preferred embodiment of the present invention is the provision of a plurality of dispensing apertures 47 which remain open when the dispensing opening 40 is closed as the separable portion 30 is in the closed position of FIG. 1. The dispensing apertures 47 become a part of the dispensing opening 40, as shown in FIG. 2, when the separable portion 30 is in the open position and the dispensing opening 40 is defined by the spacing between the displaced separable portion 30 and the remainder 32 of container 12. The one or more dispensing apertures 47 are provide to accomplish a more restricted dispersion or outflow of the chum content or at least a portion thereof if it is desired to maintain the separable portion 30 in the closed position. By way of example, the container 12 may be lowered to a preferred depth and the upwardly directed force 27' being exerted on the container 12 may be delayed until at least a minimal amount of chum content has been dispersed through the apertures 47 prior to the separable portion 30 assuming the open position of FIG. 2. After a predetermined time or as desired by the user, the upwardly directed force 27' may be exerted on the container causing the axial, linear displacement of the separable portion 30 into the open position as set forth above.

Other structural features of at least one preferred embodiment of the present invention are disclosed in FIGS. 6 and 7. The container 12 or more specifically the remainder portion 32 may comprise a plurality of shell-like segments 32' and 32". Each segment may be somewhat correspondingly dimensioned to define a proximate half of the cylindrical configuration of the container 12 as demonstrated in FIGS. 1 through 5. Attachment of the shell segments 32' and 32" may be along a periphery, as at 35 and be at least partially accomplished by clamp type connectors 37 mounted along the peripheral edges 35. In addition, a cross-brace assembly generally indicated as 60 may include a receiving portion 62 and a male, mating portion 64 wherein corresponding ends thereof are coaxially aligned and secured together as at 66. Securement thereof may be by any conventional fashion including adhesive, heat welding, etc. When so joined, the two shell segments 32' and 32" form the aforementioned cylindrical configuration of the sidewall 12 which is disposed in surrounding relation to the hollow interior 18.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A chum dispensing assembly comprising:
  a) a container having a hollow interior dimensioned to contain a quantity of chum therein,
  b) said container including a separable portion and a dispensing opening, said dispensing opening communicating with said hollow interior,
  c) a connecting assembly movably connecting said separable portion to a remainder of said container and structured to dispose said separable portion between an open position and a closed position relative to said dispensing opening,
  d) said connecting assembly and said separable portion linearly displaceable relative to the remainder of the container from said closed position to said open position, upon a predetermined force being applied to said container, and
  e) said connecting assembly comprising a plurality of track portions and a plurality of follower portions; said track portions disposed on said container in spaced relation to one another and extending along at least a portion of the length thereof.

2. A chum dispensing assembly as recited in claim 1 wherein said connecting assembly is secured to said separable portion and movable therewith relative to the remainder of said container.

3. A chum dispensing assembly as recited in claim 1 wherein said dispensing opening is disposed between said separable portion and the remainder of said container and sufficiently dimensioned to pass chum from said hollow interior when said separable portion is in said open position.

4. A chum dispensing assembly as recited in claim 3 wherein said dispensing opening is formed substantially continuously about a periphery of said container.

5. A chum dispensing assembly as recited in claim 4 wherein said separable portion is axially displaced outwardly from the remainder of said container when said separable portion is in said open position.

6. A chum dispensing assembly as recited in claim 3 wherein said separable portion substantially defines one end of said container and is disposed in an axially spaced orientation from the remainder of said container when in said open position.

7. A chum dispensing assembly as recited in claim 6 wherein said dispensing opening is disposed substantially adjacent said separable portion at one end of said container.

8. A chum dispensing assembly as recited in claim 1 wherein each of said plurality of follower portions is movable with said separable portion relative to the remainder of said container.

9. A chum dispensing assembly as recited in claim 1 wherein said plurality of track portions are integrally formed in and extend along the length of said container; said plurality of follower portions being connected to said separable portion and reciprocally movable along the length of said plurality of track portions concurrent with said separable portion moving between said closed position and said open position.

10. A chum dispensing assembly as recited in claim 1 wherein said container comprises a weight retaining portion structured to removably retain additional weight on said container.

11. A chum dispensing assembly as recited in claim 10 wherein said weight retaining portion comprises a chamber secured to said separable portion and movable therewith relative to the remainder of the container.

12. A chum dispensing assembly as recited in claim 1 wherein each of said plurality of track portions further includes an elongated strut secured to a corresponding one of said follower portions and interconnecting said follower portion to said separable portion.

13. A chum dispensing assembly as recited in claim 12 wherein said strut includes an elongated channel extending along at least a majority of the length thereof, said channel disposed and dimensioned to receive a nipple member secured to the container, therein; said channel further including a retaining portion disposed and dimensioned to removably secure said nipple in a predetermined position along said channel; said predetermined position at least partially defined by said separable portion being disposed in said closed position.

14. A chum dispensing assembly comprising;
  a) an elongate container having a sidewall disposed in substantially surrounding relation to a hollow interior,
  b) a dispensing opening disposed on said container in communicating relation with said hollow interior,
  c) a separable portion defining one end of said container and a connecting assembly movably connecting said separable portion to a remainder of said container,
  d) said dispensing opening disposed at a junction of said separable portion and the remainder of said container and dimensioned to allow passage of chum from said hollow interior there through,
  e) said connecting assembly structured to facilitate co-axial displacement of said separable portion relative to the remainder of said container into and out of an open position, and
  f) said connecting assembly further comprising a plurality of follower portions; said track portions disposed on said container in spaced relation to one another and extending along at least a portion of said container.

15. A chum dispensing assembly as recited claim 14 wherein said dispensing opening is at least partially defined by a spacing between said separable portion and the remainder of said container when said separable portion is in said open position.

16. A chum dispensing assembly as recited in claim 15 wherein said dispensing opening is disposed in said sidewall and includes a substantially continuous configuration extending about a periphery of said container.

17. A chum dispensing assembly as recited in claim 14 wherein said container comprises a substantially cylindrical configuration and at least one fill opening formed in said container.

18. A chum dispensing assembly as recited in claim 17 wherein said fill opening is formed in an end of said container substantially opposite to said separable portion.

19. A chum dispensing assembly as recited in claim 17 further comprising a plurality of vents formed in said container in spaced relation to one and other, said vents disposed and dimensioned to allow inflow of water into said hollow interior when said container is submerged.

20. A chum dispensing assembly comprising:
  a) an elongate, substantially cylindrical container including a hollow interior dimensioned to hold chum therein,
  b) a separable portion defining one end of said container and a connecting assembly movably connecting said separable portion to a remainder of said container,
  c) a dispensing opening disposed on said container and dimensioned to allow chum to pass there through from said hollow interior,
  d) said connecting assembly structured to facilitate axial displacement of said separable portion relative to the remainder of said container into and out of an open position,
  e) said connecting assembly comprising a plurality of track portions and a plurality of follower portions; said track portions disposed on said container in spaced relation to one another and extending along at least a portion of the length thereof,
  f) said dispensing opening comprising a substantially continuous configuration extending about a transverse periphery of said container, and
  g) said dispensing opening at least partially defined by a spacing between said separable portion and the remainder of said container when said separable portion is in an open position.

21. A chum dispensing assembly as recited in claim 20 wherein said connecting assembly comprises a track assembly including at least one track portion disposed on said container and extending along at least a portion of a length thereof, said track assembly further comprising a follower portion movable along a length of said track portion.

22. A chum dispensing assembly as recited in claim 21 wherein said follower portion is movable with said separable portion relative to the remainder of said container.

23. A chum dispensing assembly as recited in claim 22 wherein said track portion is integrally formed on and extends along a length of said container; said follower portion being connected to said separable portion and reciprocally movable along a length of said track portion concurrently with said separable portion moving between said closed and open positions.

24. A chum dispensing assembly as recited in claim 20 wherein said plurality of follower portions are connected to and movable with said separable portions relative to the remainder of said container.

25. A chum dispensing assembly as recited in claim 20 further comprising at least a first fill opening formed in one end of said container substantially opposite to said separable portion.

26. A chum dispensing assembly as recited in claim 25 further comprising at least a second fill opening formed in said separable portion, said fill openings disposed in said opposite ends of said container.

27. A chum dispensing assembly as recited in claim 26 further comprising a cover assembly including at least one cover member removably secured to at least one of said fill openings.

28. A chum dispensing assembly as recited in claim 20 further comprising a plurality of vents formed in said container in spaced relation to one another, said vents disposed and dimensioned to allow inflow of water into said hollow interior when said container is submerged.

* * * * *